Aug. 6, 1946.  W. B. EWING  2,405,198
MEANS FOR CONTROLLING ADVANCEMENT OF STOCK
Filed May 26, 1943  5 Sheets-Sheet 1

INVENTOR.
WALKLEY B. EWING
BY
ATTORNEYS

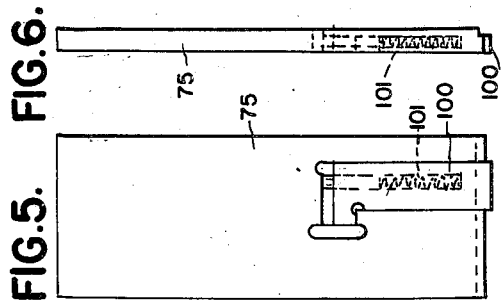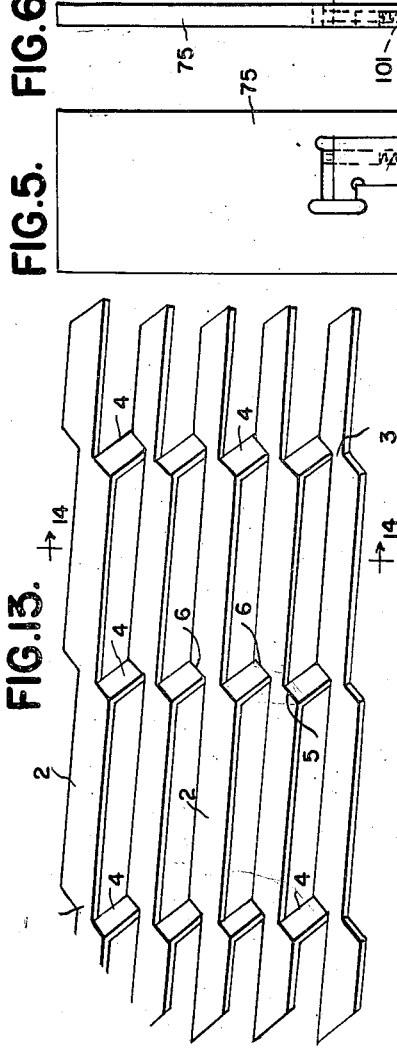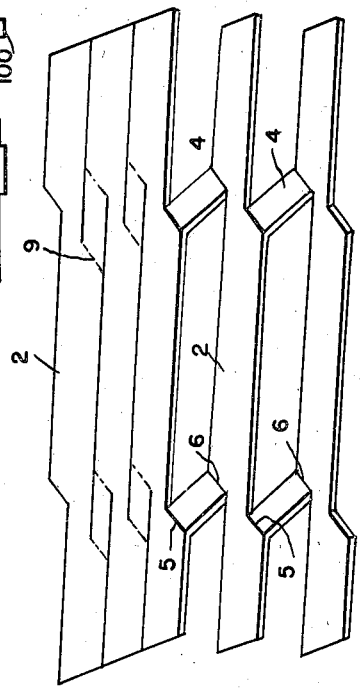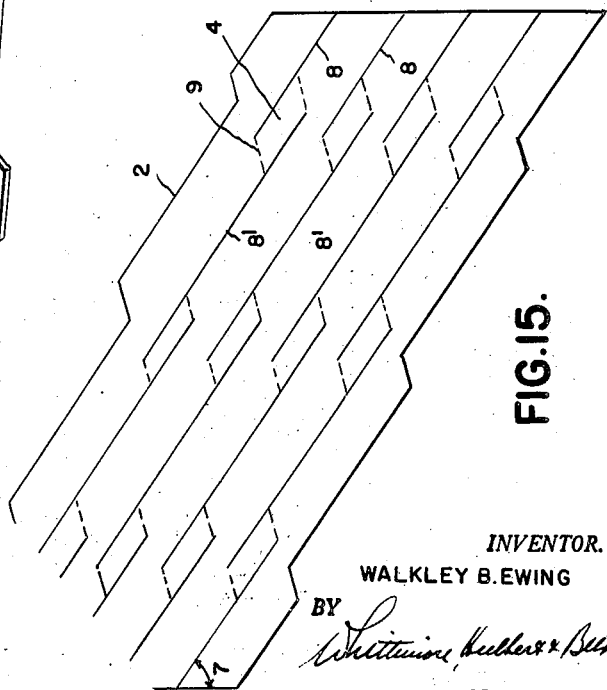

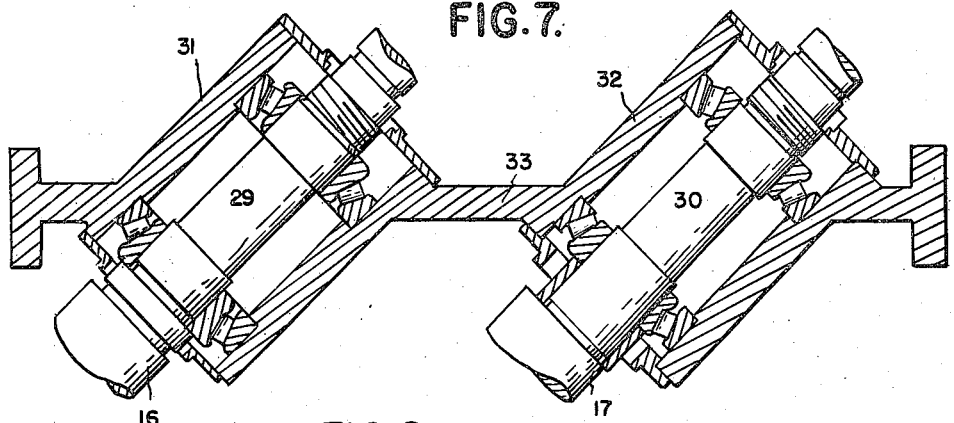
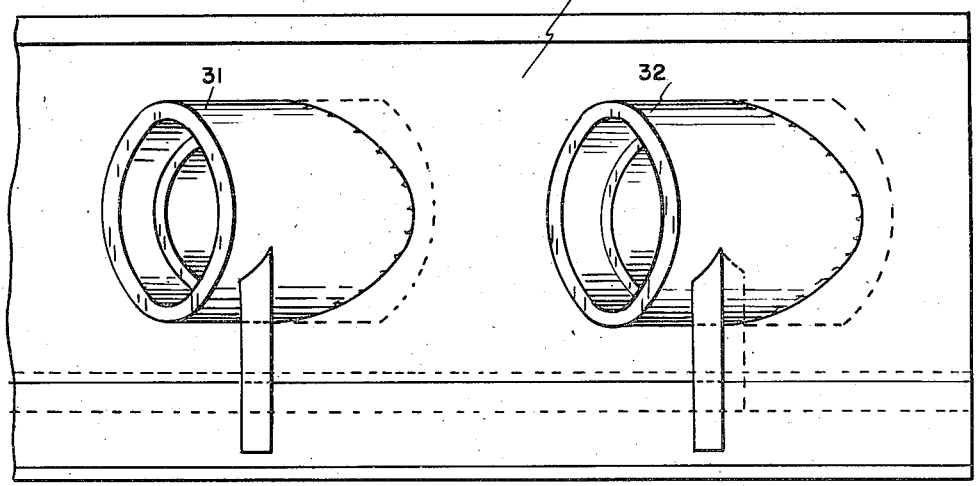
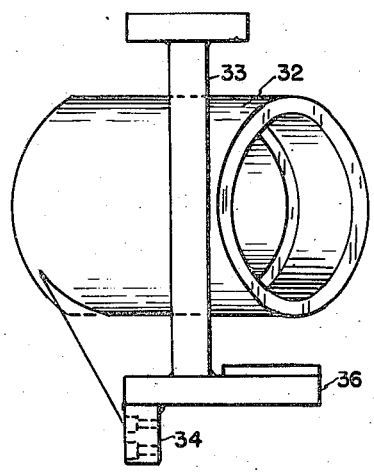

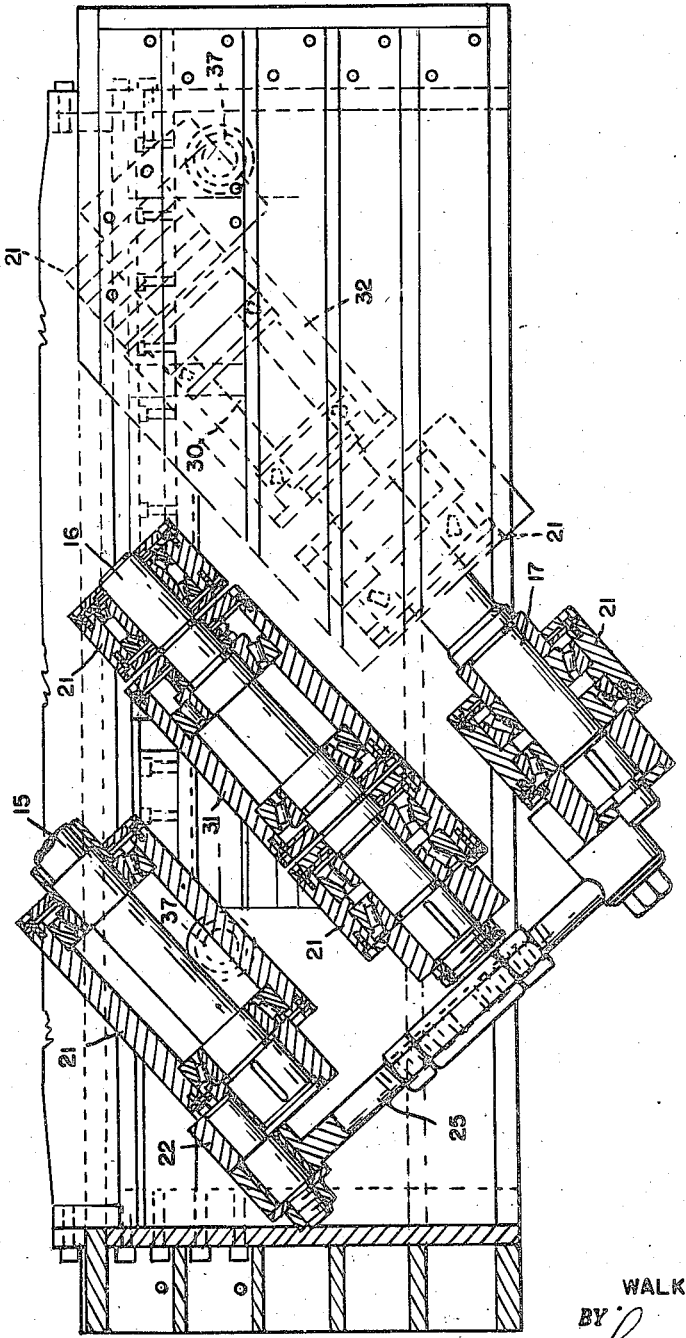

Patented Aug. 6, 1946

2,405,198

UNITED STATES PATENT OFFICE 2,405,198

MEANS FOR CONTROLLING ADVANCEMENT OF STOCK

Walkley B. Ewing, Frankfort, Mich., assignor to Ewing Development Company, Bay City, Mich., a corporation of Michigan Application May 26, 1943, Serial No. 488,612

5 Claims. (Cl. 164—6.5)

This invention relates generally to means for controlling the advancement of stock and refers more particularly to means for controlling the advancement of sheet material through a machine having cooperating punch and die assemblies for transforming the sheet material into sun screens.

One of the essential objects of the invention is to provide a machine wherein means is provided for controlling the advancement of the stock so that it may advance in fast, short strokes through the machine.

Another object is to provide a machine wherein two means, preferably arranged in tandem, is provided for successively stopping or limiting the advancement of the sheet material.

Another object is to provide a machine wherein both means just mentioned are carried by but are movable relative to a reciprocating punch assembly of the machine.

Another object is to provide a machine wherein both means operate in timed relation to each other and to the punch assembly during reciprocation thereof.

Another object is to provide a machine wherein the means for controlling the advancement of stock is simple in construction, easy to install and efficient in operation.

Other objects, advantages and novel details of construction of this invention will be made more apparent as this description proceeds, especially when considered in connection with the accompanying drawings, wherein.

Figure 1:
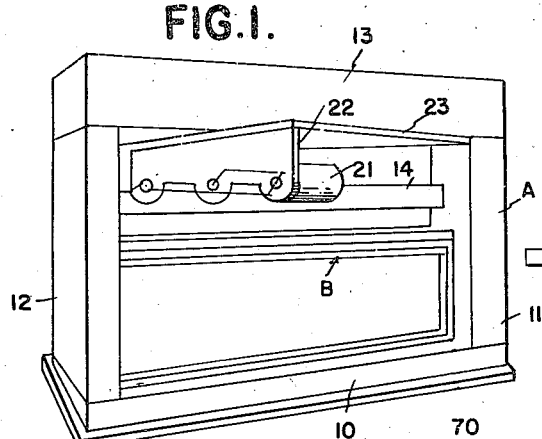
Figure 1 is a perspective view of the main frame of the machine, with a schematic assembly of the drive shaft, two eccentric shafts and connectors upon the supports therefor carried by said frame.
Figure 2:
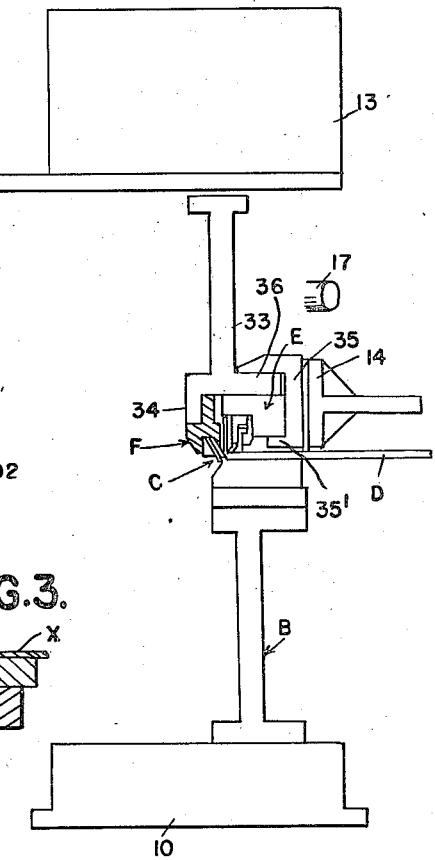
Figure 2 is a vertical sectional view through the machine at the center line thereof, with parts in elevation.
Figure 3:
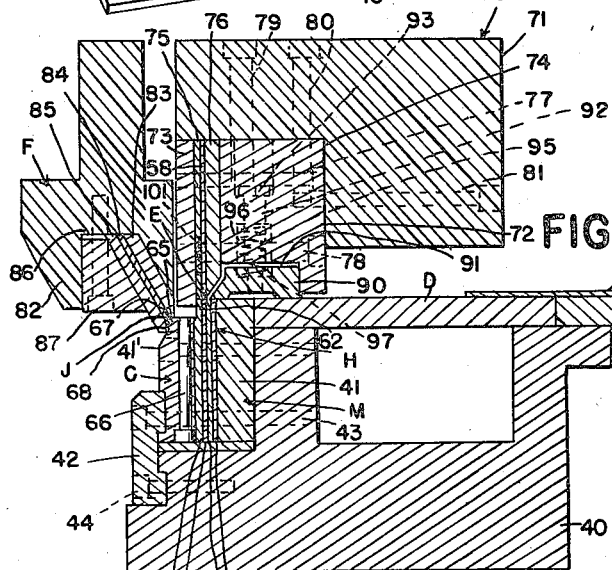
Figure 3 is a vertical sectional view through the slitter and folder punch and die assemblies.
Figure 4:
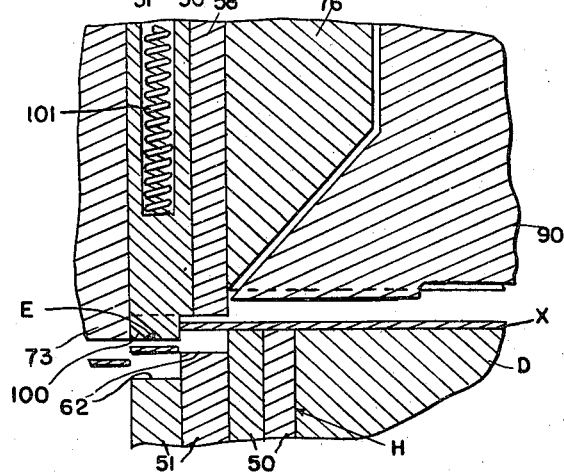
Figure 10:
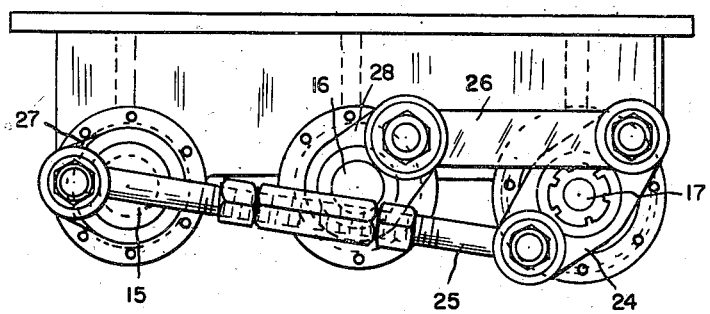
Figure 11:
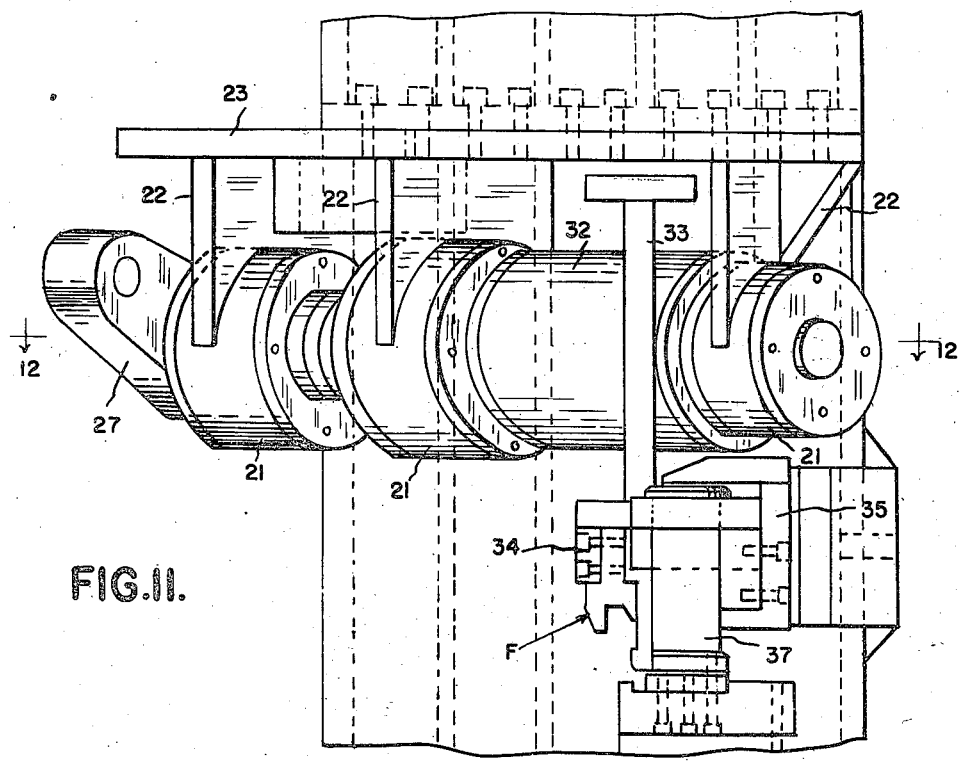

Figure 4 is an enlarged fragmentary vertical sectional view through the slitter punch assembly and cooperating die assembly when the punch assembly is in fully raised position, with the stripper bar in raised position to permit advancement of the sheet material, and the spring pressed insert in lowered position to limit such advancement, and showing by dotted lines the further advancement of the sheet material;

Figure 5 is a detail elevational view of one of the spacers in the slitter punch assembly;

Figure 6 is an edge elevation of the spacer illustrated in Figure 5;

Figure 7 is a horizontal sectional view through the upright beam and bearings for the eccentric shafts for actuating the same;

Figure 8 is a fragmentary elevational view of the upright beam and bearing sleeves illustrated in Figure 7;

Figure 9 is an end view of the structure illustrated in Figure 8;

Figure 10 is an elevational view of the drive means and support therefor;

Figure 11 is an end elevation of the structure illustrated in Figure 10;

Figure 12 is a horizontal sectional view taken substantially on line 12—12 of Figure 11 and shown partly in dotted lines to disclose the bed therewith.

Figure 13 is an enlarged front elevation of a small portion of a preferred form of sun screen made by the machine;

Figure 14 is a cross sectional view taken on the line 14—14 of Figure 13;

Figure 15 is an enlarged plan view of a portion of a slitted blank used in making the sun screen illustrated in Figures 13 and 14; and Figure 16 is a perspective view of the blank of Figure 15 partially folded into the screen structure illustrated in Figures 13 and 14.

The sun screen produced by a machine embodying my invention is formed by slitting and folding a single sheet of material and consists of a series of parallel strips 2 of elongated cross section which are vertically superposed at equal intervals not greatly exceeding, and preferably approximately equal to, the width of a strip, and are inclined, preferably at least 45°, and perhaps as much as 75°, to the general plane of the screen, i. e. to the vertical.

As shown, each individual strip 2 extends horizontally across the screen and lies in a single plane. Preferably each strip 2 is offset regularly in the same direction at equal intervals along its length, as at 3, the distance of offset not exceeding about three-fourths the width of the strip, and being advantageously about one-half such width. The strips 2 are joined together by vertical rows of legs 4 formed of sheet material integral with that of the strips, each leg having a width substantially equal to the regular offset distance of each strip, i. e. not greater than about three-fourths the width of a strip, and connecting a front portion 5 of a strip with the corresponding oppositely offset rear edge 6 of an adjacent strip. The rows of legs 4 are ordinarily spaced apart a distance large in comparison to the intervals between adjacent strips. As will be seen from the drawings, the legs 4 are inclined to the general plane of the screen, and are also rather sharply inclined to the strips to which they are attached. The legs in any given row are ordinarily in the same or in parallel vertical planes, and preferably have their centers all in the same vertical line, in order to give a generally rectangular appearance to the screen.

While the sun screen is illustrated with only two offsets per strip and two rows of legs, it will be appreciated that it may comprise any number of offsets and corresponding rows of legs, to form a screen of the desired dimensions. In general, the width of a strip will be from one-eighth to one-half inch, and the distance between rows of legs one-half to five inches, although other sizes are equally possible. The screen is usually fabricated of thin sheet metal, but may also be formed of other flexible, strong materials, such as synthetic plastic sheet.

For the purpose of definition, the sun screen may also be considered as comprising a plurality of parallel vertically superposed horizontally extending series of strip elements, the individual elements of each horizontal series being inclined to the general plane of the screen and to the horizontal and being interconnected in offset relation, and leg members connecting the strip elements of each horizontal series with the corresponding elements of an adjacent horizontal series. In this concept, the individual elements of each horizontal series of strip elements are preferably interconnected by offset members in such manner that the said elements and said offset members together constitute a single integral strip lying in one plane.

In making the sun screen of the invention, the sheet material or blank from which the screen is to be fabricated is first preferably slit and is then formed into the screen. Preferably this blank comprises a sheet substantially rhomboidal in shape and having therein on the bias to an edge thereof a plurality of like parallel series of parallel regularly offset overlapping slits, said slitted sheet thus defining a plurality of parallel continuous regularly offset strip members interconnected at their corresponding oppositely offset portions by leg members.

As shown in Figure 15 the parallel slits are all disposed at a bias angle 7, determined as hereinafter explained, and are arranged in a plurality of like parallel series, as at 8 and 8'. The individual lines within a series are regularly offset a distance which does not exceed about three-fourths the distance between corresponding lines of adjacent series, and overlap at their offset positions a distance which does not greatly exceed, and need not equal, the distance between corresponding lines of adjacent series. As a result of this slitting, there are formed parallel continuous regularly offset strip members 2 interconnected at their corresponding oppositely offset portions by leg members 4.

The blank slitted as described is formed into a sun screen by successively displacing each strip member diagonally downward and backward in the bias direction to force the strips into substantially parallel planes and to cause the leg members to become inclined to the strips and to the general plane of the resulting screen. A partially folded blank showing two of the strip members already displaced into position is illustrated in Figure 16.

The displacement of the strip members 2 and the concurrent formation of the legs 4, may be rendered more accurate by defining on the blank fold lines 9 to mark the point of juncture of the leg members 4 with the strips 2, either by suitably crimping the blank or by other means. The fold lines 9 are ordinarily oblique to the long edges of the strips 2 and are preferably in the same or parallel planes.

The angle at which the strips 2 are inclined to the general plane of the screen is controlled by three factors, i. e. the angle of the fold lines, the bias angle 7, and the degree of fold imparted to the leg members 4. In making the screen, these angles and the various dimensions of the strips 2 and leg members 4 are chosen so that, in the final screen, the strips 2 have an inclination capable of providing the desired protection from direct sunlight. The precise choice of these angles and dimensions is made from mathematical formulas which have been developed from the geometry of the screen and the blank.

The screen may be fabricated by extremely simple means from a single sheet of material, and can be made in any desired size. The metal in the screen is not under stress, having been merely folded into position. The structure presents only smooth, flat surfaces, and hence collects little dust or dirt, and can be easily cleaned. If desired, it may be rolled up for shipping.

Referring now to the machine for making the sun screen, A is the main frame having a base 10, uprights 11 and 12 respectively at opposite ends of the base, and a top 13 mounted upon the uprights. B is an auxiliary frame mounted within the main frame A at the bottom thereof and constituting a support for a die assembly C and feed bed D; and 14 is a horizontally disposed T-beam extending between and terminally secured to the uprights 11 and 12 of the main frame in upwardly and rearwardly offset relation to the auxiliary frame B.

15, 16 and 17 respectively are parallel horizontal shafts disposed obliquely to the longitudinal median line of the main frame and supported from the top 13 thereof and adapted to be driven from a motor (not shown) or other suitable power plant upon the top 13 of the frame. Preferably the shafts 15, 16 and 17 respectively are mounted in suitable bearings within sleeves 21 suspended by a bracket 22 from a plate 23 rigidly secured to the underside of the top 13 of the frame.

In the present instance the shaft 15 is a rotating shaft, while the shafts 16 and 17 respectively merely oscillate and are driven in unison from the shaft 15. As shown, a double crank arm 24 is carried by the shaft 17 and is connected by rods 25 and 26 respectively to cranks 27 and 28 respectively carried by the shafts 15 and 16. Thus, rotary movement of the shaft 15 will be translated by the crank 27, rod 25 and crank 24 into oscillating movement for the shaft 17, and such oscillating movement of shaft 17 will be transmitted by the rod 26 and crank 28 to the shaft 16 so that both shafts 16 and 17 will oscillate in unison.

Preferably the shafts 16 and 17 have eccentric portions 29 and 30 respectively carrying bearings for tubular sleeves 31 and 32 respectively from which a vertical I-beam 33 is suspended in substantially vertical alignment with the auxiliary frame B for actuating simultaneously a slitter punch assembly E and a folder punch assembly F relative to the die assembly C.

The punch assembly E reciprocates vertically relative to the die assembly C to provide slits such as 8, 8' in the sheet material, while the folder punch assembly F oscillates relative to the die assembly C to fold portions of the sheet material beside the slits into louvers and interconnecting legs such as 2 and 4 respectively.

The folder punch assembly F is beside but separate from the punch assembly E and is secured to a depending leg or flange 34 of the I-beam 33 so as to oscillate in unison therewith as such beam is actuated by the eccentrics 29 and 30 of the shafts 16 and 17. A yoke 35 straddles the punch assembly E and the base 36 of the I-beam 33 and cooperates with said base for translating the oscillating movement of the I-beam into a vertical reciprocating movement for the punch assembly E. In this connection it will be noted that the yoke 35 is guided vertically by the head of the T-beam 14 carried by the main frame and that the punch assembly E is guided vertically by means of pins 37 mounted upon the auxiliary frame B.

The die assembly C has a base 40 mounted upon the auxiliary frame B beneath the feed bed D and includes a slitter die H and a folder die J. Preferably the slitter die H is clamped between sections 41 and 41' of a suitable holder M on the base 40 at the inner end of the feed bed D, while the folder die J is anchored upon the outer section 41' of the holder for the slitter die H. Any suitable means such as a clamp 42 and bolts 43 and 44 respectively may be employed to fasten the holder sections 41, 41' to the base 40.

The slitter die H has plate-like blades 50 and plate-like spacers 51 beside said blades. The upper ends 62 of the spacers 51 are flat and are preferably arranged in stepped relation to each other and to the upper ends of the slitter blades 50.

The folder die J comprises a series of block-like members 65 which are anchored by bolts 66 upon the outer sections 41' of the die holders M in stepped relation to the spacers 51, and are provided at their outer edges with stepped undercut portions 67 and 68 respectively.

The punch assembly E includes a holder 70 having a head 71 between the base 36 of the I-beam 33 and the lower arm 35' of the yoke 35, and clamping sections 72 and 73 respectively which are carried by the head 71 within a recess 74 in the lower forward corner thereof. The slitter blades 58 of the punch assembly are disposed in upright staggered overlapping parallel relation to each other between plate-like spacers 75 and 76. Any suitable means such as bolts 77 and 78 may be used to hold together the clamping sections 72 and 73, and any suitable means such as the bolts 79, 80 and 81 respectively may be used to fasten the clamped sections 72 and 73 to the head 71.

When assembled between the sections 72 and 73, the lower working ends of the slitter blades 58 project slightly below the lower ends of the spacers 76 so as to overlap in scissor-like formation the cutting edges of the slitter blades 50 on the downward stroke of the punch holder 70 to effect the slitting operation. The lower ends of the spacers 75 and clamping sections 73 are substantially flush with each other and are disposed in lowered stepped relation to the lower working ends of the blades 58.

The folder punch assembly F comprises a die holder 82 rigid with the depending flange 34 of the I-beam 33, and folder blades 83, 84 and 85 respectively within a recess 86 in the lower end of the holder 82 are held in assembled relation therein by means of a clamping wedge 87 that is bolted or otherwise suitably connected to the holder. As shown, the blades 83 to 85 inclusive are arranged in overlapping inwardly inclined relation with the lower working ends thereof in downwardly stepped relation for mating engagement with the top and undercut portions 67 and 68 of the die blocks 65.

In the present instance, the sheet material X is fed from a power driven roll thereof (not shown) onto and along the feed bed D beneath the T-beam 14 to the slitter punch and die assemblies E and H respectively which collectively constitute the first station where the slits 8, 8' are successively formed. Such material X is then advanced to the folder punch and die assemblies F and J which collectively constitute the second station where portions of the material beside the slits are folded into inclined relation to the sheet material to form the louvers 2 and legs 4 of the sun screen.

A stripper bar 90 is movable vertically within a suitable recess 91 in the lower end of the clamping section 72 of the holder 70 for engagement with the sheet material X to partially control the advancement thereof to the two stations mentioned. As shown, this stripper bar 90 is connected to the lower end of a vertical bolt 92 slidably mounted in the clamping section 72 and having the head 93 thereof within a recess 94 in said clamping section. A coil spring 95 is sleeved upon the bolt 92 within an enlarged recess 96 in the clamping section 72 and in a similar recess 97 in the stripper bar 90 and urges the latter downwardly upon the sheet material X to hold it against such advancement. However, when the head 93 of bolt 92 engages the bottom of the recess 94 in the clamping section 72 during the upward movement of the punch holder 70, the stripper bar 90 will be raised to permit advancement of the sheet material from the first station to the second station. Cooperating with the stripper bar 90 is an insert 100 slidably mounted within the spacer 75 and normally urged downwardly by a coil spring 101 in said spacer into the path of the advancing sheet material X to limit the advance thereof after it has passed the first station.

During the initial upward movement of the holder 70, the stripper bar 90 will be held down by the spring 95 in engagement with the sheet material X to prevent it from advancing until the insert 100 in spacer 75 reaches its fully projected downward position. Thus, clearance is provided between the insert 100 and the spacers 51 to permit advancement of the sheet material but such advancement is still prevented by the stripper bar 90. During final upward movement of the punch holder 70 the stripper bar 90 is raised as aforesaid out of contact with the sheet material to permit its advancement. The sheet material will then be advanced until the forward edge of the sheet abuts the insert 100.

Upon the initial downward stroke of the holder 70 the stripper bar 90 will move downwardly to again engage and hold the sheet material against advancement. Upon the final downward stroke of the holder 70 the insert 100 will engage and be pressed upwardly into the spacer 75 by the upper end of the lowermost spacer 51. Thus, the sheet material is alternately held and released for advancement during reciprocation of the holder 70.

In use, the shafts 16 and 17 are oscillated in unison when the shaft 15 is rotated, hence the I-beam 33 carried by the eccentric portions 29 and 30 respectively of said shafts is likewise oscillated.

During the downward swinging movement of the beam 33 the folder punch assembly F carried thereby will be moved in an arc down and back relative to the cooperating folder die assembly J to effect a folding operation, and the punch assembly E will be moved vertically downward by the base 36 of the beam to cooperate with the die assembly H to effect a slitting operation. Thus, a slitting operation and a folding operation are performed simultaneously during the downward swinging movement of the beam 33.

During the upward movement of the beam 33 the folder punch assembly F will be moved in an arc upwardly and forwardly away from the die assembly J, and the punch assembly E will be moved by the lower arm 35' of the yoke 35 vertically upward away from the die assembly H. Consequently the punch assemblies E and F will be raised simultaneously. In fact, reciprocating movement is translated to the slitter punch assembly E from the oscillating beam 33 while oscillating movement is imparted directly to the folder punch assembly F by said beam.

The sheet material to be formed into sun screens is fed onto and along the feed bed D under the T-beam 14 to the stripper bar 90.

When the punch assembly E is first fully raised by the yoke 35 and beam 33 as aforesaid, the sheet material will be advanced until the forward end thereof abuts the adjacent side of the spring projected insert 100 which will serve as a temporary stop therefor, as illustrated in Figure 4.

Upon the first downward stroke of the punch assembly E relative to the die assembly H, the cooperating cutting edges of the blades 50 and 58 will overlap one another to form a slit in the sheet material, consequently the blade 50 will depress below the upper end of the blade 58 the portion of the material between the forward end thereof and the slit so formed. During this operation the stripper bar 90 is held by the spring 95 in firm engagement with the sheet material to temporarily prevent further advancement thereof on the feed bed.

When the punch assembly E is again fully raised, the sheet material will be advanced until the rear edge of the formed slit aforesaid abuts the adjacent side of the spring projected insert 100, and such advancement of the material will cause the depressed portion thereof, i. e. the portion between the forward end of the sheet and the forward edge of the formed slit, to be advanced beneath the projected insert 100.

During the next downward stroke of the punch assembly E relative to the die assembly H, a second slit will be formed as aforesaid by the blades 50 and 58 in the sheet material in staggered overlapping parallel relation to the first mentioned slit, and the portion of the material between the first and second slits will be depressed below the rear edge of the second formed slit.

When the punch assembly E is again fully raised, the sheet material will be advanced until the rear edge of the second formed slit abuts the adjacent side of the spring projected insert 100, and such advancement of the material will cause the first mentioned depressed portion of the material to be advanced over the folder die J, and will cause the second mentioned depressed portion to be advanced beneath the projected insert 100.

Thus, the sheet material will be successively advanced a distance equal to the width of a depressed portion each time the punch assembly E is fully raised during vertical reciprocation thereof.

After a sixth slit is formed as aforesaid in the sheet material by the blades 50 and 58, the material will have advanced further until the first mentioned depressed portion of the material, i. e. the portion between the forward end of the material and the first slit, is positioned between the working portions 67, 68, 83, 84 and 85 respectively of the punch and die assemblies F and J.

When a seventh slit is being formed in the sheet material the punch and die elements 67, 68, 83, 84 and 85 respectively of the assemblies F and J will fold the first mentioned depressed portion of the material downward and backward to provide an inclined louver 2 and leg 4. Thereafter, during each downward stroke of the beam 33, a folding operation to produce a louver 2 and leg 4 occurs simultaneously with a slitting operation as the sheet material is advanced as aforesaid through the machine.

When a slit is formed in the sheet material, the cutting edges of the blades 50 and 58 forming the slit have a scissor-like action which causes a louver 2 to be slightly preformed by a slight displacement of the material beside said slit. Inasmuch as the beveled portions 53 and 60 respectively of the blades are opposed to one another in advance of the cutting edges of said blades when the latter are in operative working position, it will be apparent that a leg 4 is also slightly preformed during this slitting operation. In this connection it will be appreciated that the blades 50 and 58 have corresponding portions 53 and 60 respectively at opposite upright edges thereof and have cutting edges at opposite sides thereof, hence such blades may be readily reversed whenever desired to provide double life thereto. It will also be appreciated that the spring pressed insert 100 and the stripper bar 90 cooperate with each other in such a way that the sheet material may be advanced rapidly and accurately through the machine.

What I claim as my invention is:

1. A machine having a stationary die assembly, a punch assembly movable relative to the die assembly to transform sheet material into a predetermined configuration, and means carried by and movable relative to the punch assembly for alternately permitting and checking the advancement of sheet material relative to the die assembly.

2. A machine having a stationary die assembly, and a punch assembly movable relative to the die assembly to transform sheet material into a predetermined configuration and including means operable automatically when the punch assembly is in a predetermined position relative to the die assembly for checking the advancement of sheet material relative to the die assembly.

3. A machine for slitting sheets comprising a table over which the sheet is advanced under continuous forward pressure, a die member having a series of shearing edge with overlapping portions arranged in the plane of the table and a depressed step beyond the same, a punch provided with a cooperating shearing edge and adapted to press the sheared portion against said step without any stretching of the metal, a stop carried by said punch spaced in advance of the shearing edge thereof equal to the width of said step, said stop in the retracted position of said punch extending into the path of the portion of said sheet on the table but clearing the depressed sheared portion thereof whereby said sheet will be successively advanced step by step.

4. A machine for slitting sheets comprising a table over which the sheet is advanced under continuous forward pressure, a die member having a series of spaced overlapping shearing edges and a depressed step beyond each of said edges, a punch provided with a corresponding series of cooperating shearing edges, a plurality of stops carried by said punch spaced in advance of shearing edges thereof, said stops in the downward movement of the punch depressing the sheared portions against said step, bending the portions between overlapping shearing edges without stretching the metal and in the retracted position of said punch extending into the path of the portion of said sheet lying on the table but clearing the depressed sheared portions thereof to permit advancement of said sheet step by step succeeding each shearing operation.

5. A machine for slitting sheets comprising a table over which the sheet is advanced under continuous forward pressure, a die member formed of a series of overlapping spaced shearing blades with the cutting edges thereof in the plane of the table and with depressed steps beyond each cutting edge, a punch formed of a corresponding series of overlapping spaced shearing blades for cooperating with the blades of the die member, and a plurality of resiliently yieldable stops carried by said punch spaced in advance of the corresponding blades and in the raised position thereof extending below the same to be in the path of the portion of the sheet lying on the table while clearing the depressed sheared portions thereof said steps in the downward movement of the punch depressing the sheared portions against said steps without stretching the metal, and a stripper carried by said punch for holding said sheet to the table during the withdrawal of the punch from the die member but releasing said sheet in the fully retracted position of the punch whereby said sheet will be successively advanced step by step following each punching operation.

WALKLEY B. EWING.